J. A. THOMPSON.
Filter.
No. 38,270.
2 Sheets—Sheet 1.
Patented April 21, 1863.
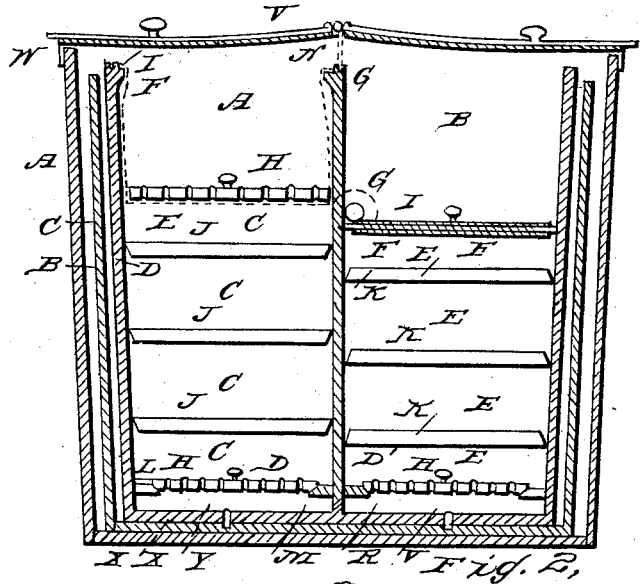
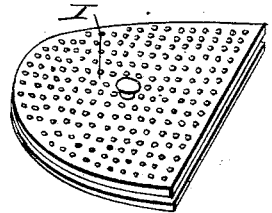
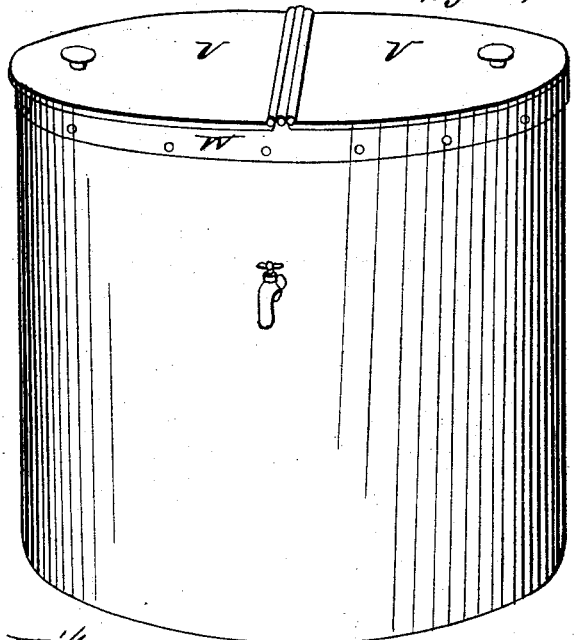
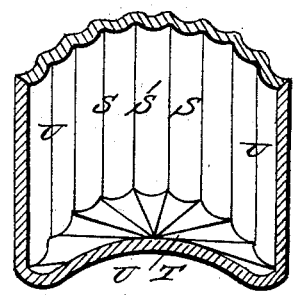
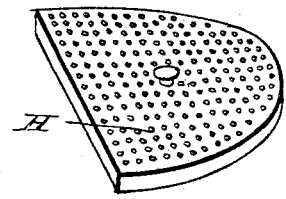
Witnesses:
J. N. Holloway
D. S. Gallagher
Inventor:
J. A. Thompson J. A. THOMPSON.
Filter.
No. 38,270.
2 Sheets—Sheet 2.
Patented April 21, 1863.
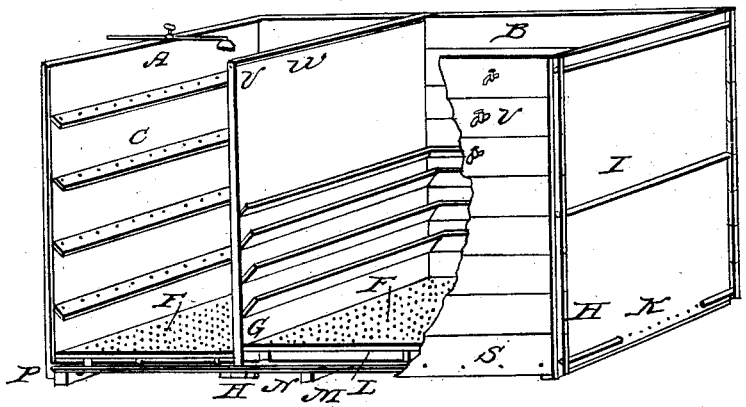
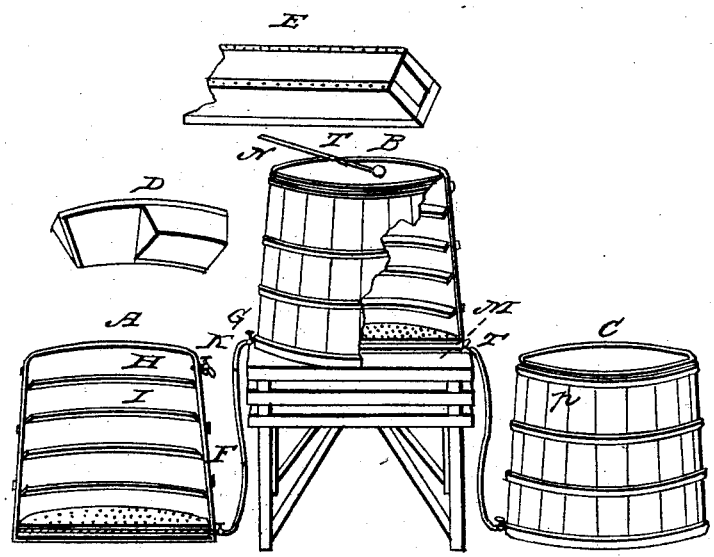
Witnesses:
Isaac Rindge
JcM. Holloway
Inventor:
J. A. Thompson

UNITED STATES PATENT OFFICE.

J. A. THOMPSON, OF GENEVA, NEW YORK.

IMPROVED FILTER.

Specification forming part of Letters Patent No. 38,270, dated April 21, 1863; antedated November 29, 1861.

*To all whom it may concern:*

Be it known that I, J. A. THOMPSON, of Geneva, in the county of Ontario and State of New York, have invented a new and useful Improvement in Filters and Coolers; and I do hereby declare that the following is a full, clear, and exact description of the same, reference being had to the accompanying drawings, making part of this specification, in which—

Figure 1 is a vertical cut section; Fig. 2, an elevation of the apparatus. Fig. 3 is a perforated plate, with a grooved edge to receive an elastic packing. Fig. 4 is a corrugated section, as shown at E, to increase its strength. Fig. 5 is a perforated plate, H.

The nature of my invention consists of a filter and cooler, for the filtration and purification of water and other liquids by the use of flannel or cloth strainers, and of prepared granulated charcoal and quartz rock granulated, so arranged and constructed that the sediment may be readily removed, and not enter into the disinfectant material, which material may also be conveniently removed and renewed, and thus be continued in full and effective action, and incasing the diaphragms in non-conducting partitions and chambers, in a manner to render it the best ice-preserver, and in strengthening the walls of the ice-chamber to prevent injury by the concussion of the ice by inward arched corrugations. Its packing or purifying material is divided into strainers or separators, disinfecting, straining, and further decolorizing and deodorizing sections.

To enable others skilled in the art to make and use my invention, I will proceed to describe its construction and operation.

A is the outer shell, constructed of strong linen or other similar paper, made with any of the water-proof sizes and cements in known use into a thick and firm board.

C is a similar board, except thinner, both of which are firmly nailed and cemented to the outer edges of the double bottom X X'.

B is a space formed by the boards A and C, which is closely filled with plaster-of-paris, water-lime, or other cement, to strengthen the case and render it air-tight and non-conducting.

D is an annular space of confined air surrounding the outer wall of the vessel E.

F is a cleat or thickening of the upper edge of the chamber A, about one-half inch or more below its edge, with holes to receive pins to attach and hold the sack-strainer, as shown in red dotted lines.

G is a partition extending to bottom, dividing the vessel into two equal chambers, A and B.

H is a perforated plate placed in strainer, and resting on the coal C.

I is a perforated plate, with a groove penetrating its edge, in which an elastic packing of felt, prepared by boiling in a weak alkali and treating with tannin, which is cemented so as to press equally on the rim-wall of chamber B, and hold the filling in its place in E E E.

J J' J'' are flanges which are projected from the sides and firmly attached, passing downward and inward into the coal, so as to carry the water away from the sides of the vessel and secure its more perfect passage through the filtering material.

K K' K'' are flanges attached as J, projecting upward and inward, to secure the passage of fluid into and through the material, and prevent the tendency of gullying or forming a channel down or up the sides of the vessel by the well-known law of attraction.

L are lugs or supports surrounding the lower portions of the chambers, to support the perforated plates H' H'', forming the false bottoms to support the filtering material M, numerous small holes passing inward, as near a perpendicular as possible, through the partition G, from space R to space R, tending both by the action of friction and gravity to leave most of the sediment in the chamber A in space R.

Y Y' are holes passing out at the bottom, to pass the accumulated sediment out from R R.

Z, Plate I, shows the position of the elastic packing as connected with the plate N, an elastic partition cemented into a groove in the frame of the cover, and its lower edge in a groove in the upper surface of the partition G, to confine the liquid in A and prevent its flow over partition G into chambers B; O, a felt packing attached to covers V V and resting on rim W, to prevent the transmission of heat to chambers A and B.

The charcoal used in this filter is prepared from select body-wood of birch or sugar-maple, charred in earth-pits and sifted to free from all dust, and recharred in a cylinder having a free circulation, so as to evolve all gases, at a temperature so low that, while the wood is fully charred, its porous structure remains open and free for action. This coal is granulated so as to pass a sieve of three-eighths-inch mesh, and again sifted in a sieve one-eighth-inch mesh, dividing into coarse and fine. Pure quartz rock or coarse gravel is broken of same size as the coal, and placed in layers finer and finer upon plate H, or false bottoms, so as to make a support for the coal, which coarse coal is placed, closely packed, in C C' C'' C''', and up under projecting flanges J J J. The fine coal is packed firmly, laying on bed of silex resting on H and coal filling chamber E E E E, which is covered at top with fine silex, and plate I, with its packing, is pressed down so as to hold it in place. The liquid is passed in at A, passes through plate H and strainer into coarse coal C C C C, and is disinfected and passes down in space R, and rises up at the greatest possible elevation through numerous small holes, M, perforating the partition G, into R, and rises through the finer coal and silex E E E E and F F through plate I, to be drawn at faucet G.

To increase the strength of the walls of the ice-chamber, I corrugate its sides and bottom, as shown in Fig. 4, by arches thrown inward, as noted, S S S, radiating from convex bottom, as shown in lines on bottom T, U being the wall of the vessel.

What I claim as new, and desire to secure by Letters Patent, is—

A filter and cooler for water and other liquids, constructed and arranged and operated substantially as described.

J. A. THOMPSON.

Witnesses:
 EDM. F. BROWN,
 L. W. DENDRÉ.